United States Patent
Brady (10) Patent No.: US 10,971,037 B2
(45) Date of Patent: Apr. 6, 2021

(54) SYNTHETIC KNEE JOINT APPARATUS AND RELATED EDUCATIONAL METHODS FOR CLINICAL KNEE JOINT EXAMINATIONS

(71) Applicant: Iowa State University Research Foundation, Inc., Ames, IA (US)

(72) Inventor: Megan Brady, West Des Moines, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 279 days.

(21) Appl. No.: 15/951,505

(22) Filed: Apr. 12, 2018

(65) Prior Publication Data

US 2018/0342180 A1  Nov. 29, 2018

Related U.S. Application Data

(60) Provisional application No. 62/511,825, filed on May 26, 2017.

(51) Int. Cl.
G09B 23/30 (2006.01)
G09B 23/34 (2006.01)
G09B 23/32 (2006.01)

(52) U.S. Cl.
CPC .............. G09B 23/34 (2013.01); G09B 23/32 (2013.01)

(58) Field of Classification Search
CPC .... G09B 23/28; G09B 23/285; G09B 23/286; G09B 23/30; G09B 23/32
USPC .................................. 434/262, 267, 272, 274
See application file for complete search history.

(56) References Cited

U.S. PATENT DOCUMENTS

| | | | | |
|---|---|---|---|---|
| 4,235,025 A * | 11/1980 | Kortge | ................... | G09B 23/32 434/274 |
| 4,350,490 A * | 9/1982 | Sandegard | ............. | G09B 23/32 434/274 |
| 4,433,961 A * | 2/1984 | Chandler | ................ | G09B 23/30 434/274 |
| 4,605,373 A * | 8/1986 | Rosen | ..................... | G09B 23/32 434/274 |
| 4,850,877 A * | 7/1989 | Mason | ................. | A61B 5/1107 434/274 |
| 5,149,270 A * | 9/1992 | McKeown | ........... | G09B 23/285 434/262 |
| 5,947,743 A * | 9/1999 | Hasson | ................ | G09B 23/286 434/262 |
| 5,997,307 A * | 12/1999 | LeJeune, Jr. | ............ | G09B 23/30 434/262 |
| 6,361,729 B1 * | 3/2002 | Strover | ................ | G09B 23/285 264/247 |
| 6,468,087 B2 * | 10/2002 | Slocum | .................. | G09B 23/32 434/262 |
| 6,908,309 B2 * | 6/2005 | Gil | ......................... | G09B 23/30 434/267 |
| 7,384,268 B2 * | 6/2008 | Browne-Wilkinson | ..................... | G09B 23/32 434/274 |

(Continued)

*Primary Examiner* — Kurt Fernstrom
(74) *Attorney, Agent, or Firm* — Davis, Brown, Koehn, Shors & Roberts, P.C.; Sean D. Solberg (57) ABSTRACT

Certain embodiments herein relate to educational knee joint models with synthetic medial and lateral menisci disposed thereon. In certain implementations, one of the synthetic menisci has specific type of tear formed therein. Other embodiments relate to educational knee joint treatment platforms having a base, an attachment wall, a coupling component, and a retention strap.

11 Claims, 7 Drawing Sheets

(56) References Cited

U.S. PATENT DOCUMENTS

| | | | | |
|---|---|---|---|---|
| 7,748,984 B2* | 7/2010 | McAllister | ............. | G09B 23/32 434/274 |
| 8,108,190 B2* | 1/2012 | Riener | ................... | G09B 23/32 434/267 |
| 8,113,847 B2* | 2/2012 | Boachie-Adjei | ....... | G09B 23/32 434/274 |
| 8,539,621 B2* | 9/2013 | West | ..................... | A61F 5/3776 5/621 |
| 8,602,032 B2* | 12/2013 | Goldsmith | ............ | A61F 5/3776 128/876 |
| 10,325,523 B2* | 6/2019 | Wilson | ................... | G09B 23/32 |
| 2014/0272867 A1* | 9/2014 | Ratcliffe | ................. | G09B 5/00 434/262 |
| 2019/0046380 A1* | 2/2019 | Meah | ..................... | A61G 13/10 |

* cited by examiner

SYNTHETIC KNEE JOINT APPARATUS AND RELATED EDUCATIONAL METHODS FOR CLINICAL KNEE JOINT EXAMINATIONS

CROSS-REFERENCE TO RELATED APPLICATION(S)

This application claims the benefit under 35 U.S.C. § 119(e) to U.S. Provisional Application 62/511,825, filed May 26, 2017 and entitled Synthetic Knee Joint Apparatus and Related Educational Methods for Clinical Knee Joint Examinations, which is hereby incorporated herein by reference in its entirety.

FIELD OF THE INVENTION

The various embodiments herein relate to methods and devices for learning and simulating clinical examination of a patient's knee for the purpose of diagnosing any damage to the knee, including damage to a meniscus.

BACKGROUND OF THE INVENTION

Figure 1A:
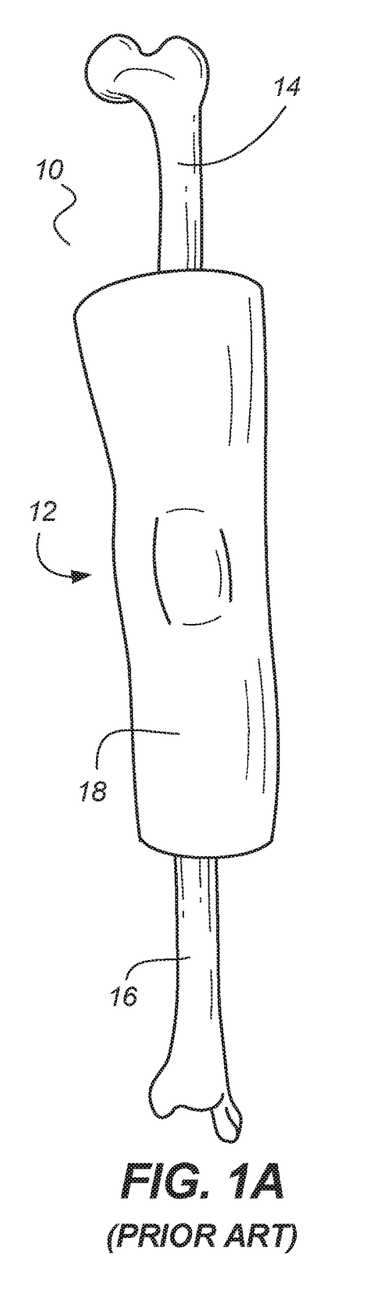
FIG. 1A is a front view of a known knee joint model positioned within a synthetic skin material.
Figure 1B:
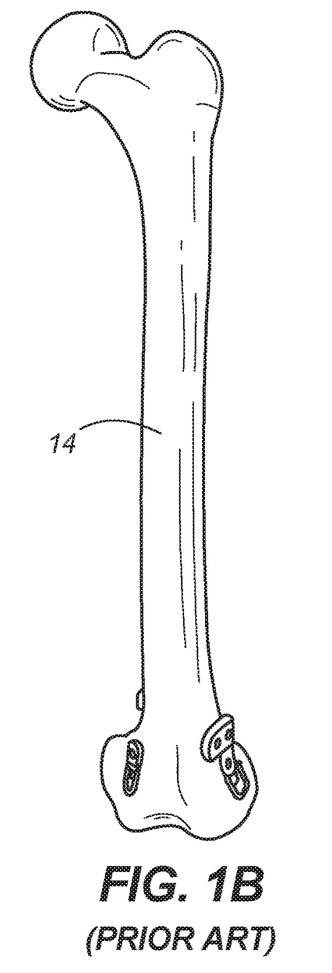
FIG. 1B is a front view of a known synthetic femur.
Figure 1C:
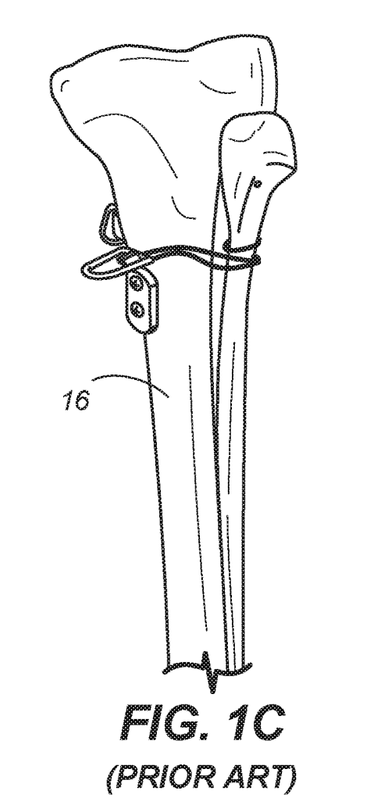
FIG. 1C is a front view of a portion of a known synthetic tibia.
Figure 1D:
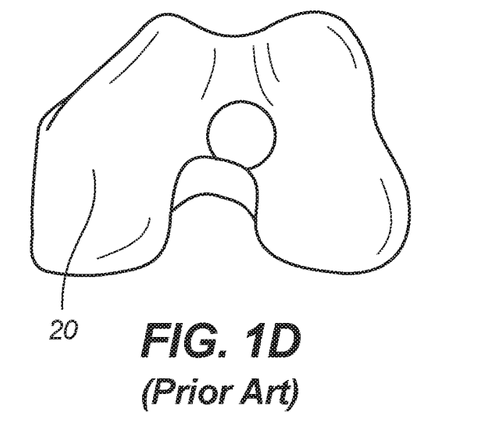
FIG. 1D is a front view of the femoral joint surface on a known synthetic femur.
Figure 1E:
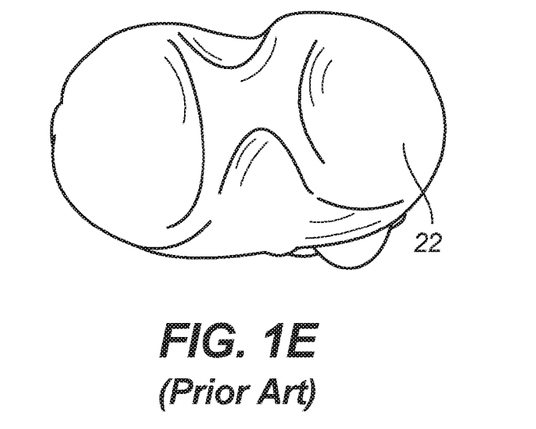
FIG. 1E is a front view of the tibial joint surface on a known synthetic tibia.
Figure 1F:
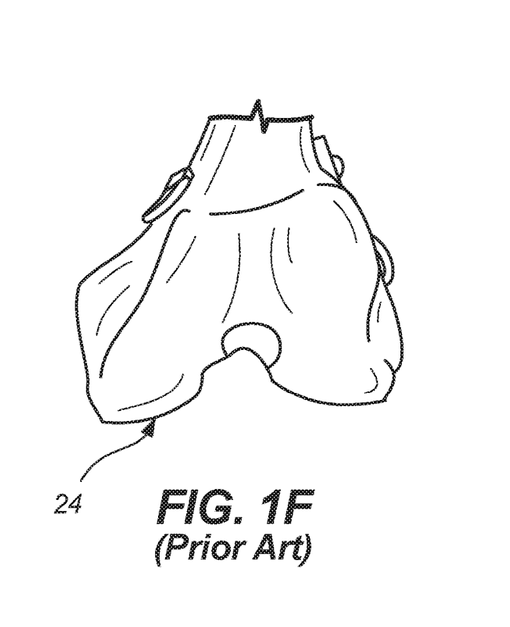
FIG. 1F is a front view of the femoral condyles on a known synthetic femur.
Figure 1G:
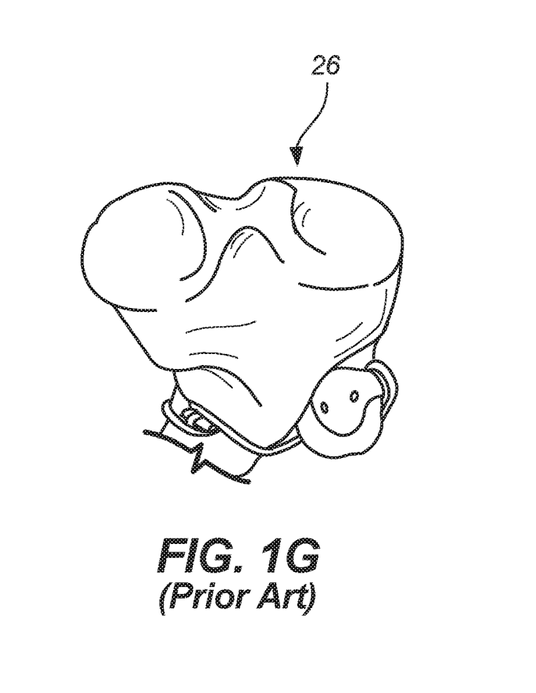
FIG. 1G is a front view of the tibial plateau on a known synthetic tibia.

The knee joint is the largest synovial joint of the human body and thus is subject to injury, especially in athletes or those living an active lifestyle that can increase the risks of such injuries. FIGS. 1A-1G depict a known leg and knee joint model 10 called a Sawbones M.I.S. Knee™ 10, which is commercially available from Pacific Research Laboratories in Vashon Island, Wash. The knee joint model 10 in this particular example has a knee joint 12 formed from the coupling of a synthetic femur 14 as shown in FIG. 1B and a synthetic tibia 16 as shown in FIG. 1C and positioned within a synthetic skin material 18 as best shown in FIG. 1A. As shown in the figures, the knee joint 12 is the point where the femur 14 (as show in FIG. 1B) and the tibia 16 (as shown in FIG. 1C) come together to form the knee joint 12. More specifically, the femoral joint surface 20 as best shown in FIG. 1D is positioned adjacent to the tibial joint surface 22 as best shown in FIG. 1E.

Two fibro-cartilagionous tissues called menisci (not shown) are disposed between the two bones 14, 16 and play a role in knee biomechanics while helping to preserve the integrity of the two surfaces 20, 22. The two menisci are the lateral meniscus and the medial meniscus (not shown), which are positioned between the femoral condyles 24 of FIG. 1F and the tibial plateau 26 of FIG. 1G. The menisci cover one half to two thirds of the tibial surface 22 and thereby help to remedy the anatomic incongruence between the femoral joint surface 20 and the tibial joint surface 22.

The health of the knee joint largely depends on the integrity of the menisci. Thus, understanding of types of meniscus tears and clinical detection of such tears can be crucial to maintaining maximum health of the menisci and the knee joint.

There is a need in the art for improved methods and devices for training practitioners in best practices and techniques for examining a patient's knee for meniscus damage.

BRIEF SUMMARY OF THE INVENTION

Discussed herein are various embodiments for clinical knee examination training.

In Example 1, a educational knee joint model comprises a synthetic tibia comprising a tibial joint surface, a synthetic medial meniscus attached to the tibial joint surface, a synthetic lateral meniscus attached to the tibial joint surface, and a synthetic femur comprising a femoral joint surface, wherein the synthetic femur is positioned such that the femoral joint surface is positioned in contact with the synthetic medial meniscus and the synthetic lateral meniscus.

Example 2 relates to the educational knee joint model according to Example 1, wherein one of the synthetic medial meniscus or the synthetic lateral meniscus has a radial meniscus tear formed therein.

Example 3 relates to the educational knee joint model according to Example 1, wherein one of the synthetic medial meniscus or the synthetic lateral meniscus has a parrot beak meniscus tear formed therein.

Example 4 relates to the educational knee joint model according to Example 1, wherein one of the synthetic medial meniscus or the synthetic lateral meniscus has a horizontal meniscus tear formed therein.

Example 5 relates to the educational knee joint model according to Example 1, wherein one of the synthetic medial meniscus or the synthetic lateral meniscus has a flap meniscus tear formed therein.

Example 6 relates to the educational knee joint model according to Example 1, wherein one of the synthetic medial meniscus or the synthetic lateral meniscus has a degenerative meniscus tear formed therein.

Example 7 relates to the educational knee joint model according to Example 1, wherein one of the synthetic medial meniscus or the synthetic lateral meniscus has a longitudinal meniscus tear formed therein.

Example 8 relates to the educational knee joint model according to Example 1, wherein one of the synthetic medial meniscus or the synthetic lateral meniscus has a bucket handle meniscus tear formed therein.

In Example 9, a educational knee treatment platform comprises a base comprising a top surface disposed on a top portion of the base, an attachment wall coupled to a proximal portion of the base, a coupling component attached to the attachment wall, and a retention strap removably attached to the base and disposed across the top surface.

Example 10 relates to the educational knee joint treatment platform according to Example 9, wherein the base further comprises side walls, wherein the top surface is disposed on top of the side walls.

Example 11 relates to the educational knee joint treatment platform according to Example 9, wherein the coupling component is constructed and arranged to be coupleable to an educational knee joint model.

Example 12 relates to the educational knee joint treatment platform according to Example 9, wherein the top surface and the retention strap are constructed and arranged to receive an educational knee joint model therebetween.

Example 13 relates to the educational knee joint treatment platform according to Example 9, wherein the top surface and the retention strap are constructed and arranged to receive an educational knee joint model therebetween such that knee joint model simulates movement of an actual knee of a patient during a clinical examination such that a student can practice performing the clinical examination of the knee joint model.

In Example 14, a method of simulating a knee joint examination comprises manipulating a knee joint model and identifying any symptoms of simulated knee joint damage in the knee joint model. The knee joint model comprises a synthetic tibia comprising a tibial joint surface, a synthetic medial meniscus attached to the tibial joint surface, a synthetic lateral meniscus attached to the tibial joint surface, and a synthetic femur comprising a femoral joint surface, wherein the synthetic femur is positioned such that the femoral joint surface is positioned in contact with the synthetic medial meniscus and the synthetic lateral meniscus.

Example 15 relates to the method according to Example 14, wherein the identifying any symptoms of simulated knee joint damage further comprises identifying a simulated radial meniscus tear, a simulated a parrot beak meniscus tear, a simulated horizontal meniscus tear, a simulated flap meniscus tear, a simulated degenerative meniscus tear, a simulated longitudinal meniscus tear, or a simulated bucket handle meniscus tear.

Example 16 relates to the method according to Example 14, wherein the manipulating the knee joint model further comprises performing a test on the knee joint model.

Example 17 relates to the method according to Example 16, wherein the performing the test on the knee joint model comprises performing a Lachman test on the knee joint model.

Example 18 relates to the method according to Example 14, further comprising disposing the knee joint model on a knee joint treatment platform prior to manipulating the knee joint model.

Example 19 relates to the method according to Example 18, wherein the knee joint treatment platform comprises a base comprising a top surface disposed on a top portion of the base, an attachment wall coupled to a proximal portion of the base, a coupling component attached to the attachment wall, and a retention strap removably attached to the base and disposed across the top surface.

Example 20 relates to the method according to Example 19, further comprising attaching the knee joint model to the coupling component.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The various embodiments disclosed or contemplated herein relate to educational devices and methods relating to the clinical examination of a patient's knee for the purpose of diagnosing any damage to the knee, including damage to a meniscus.

According to certain embodiments, the educational methods and devices can be incorporated into or used with a known leg and knee joint model as will be described in further detail herein. In one implementation, the knee joint model 10 can be the Sawbones M.I.S. Knee™ 10 as discussed above and as best shown in FIGS. 1A-1C.

Figure 2A:
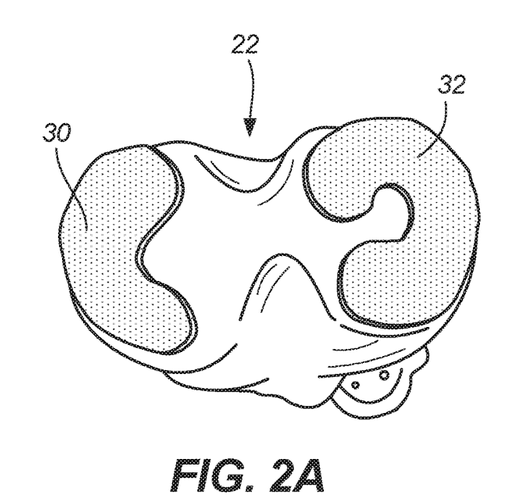
FIG. 2A is a top view of a synthetic medial meniscus and a synthetic lateral meniscus disposed on a tibial joint surface, according to one embodiment.
Figure 2B:
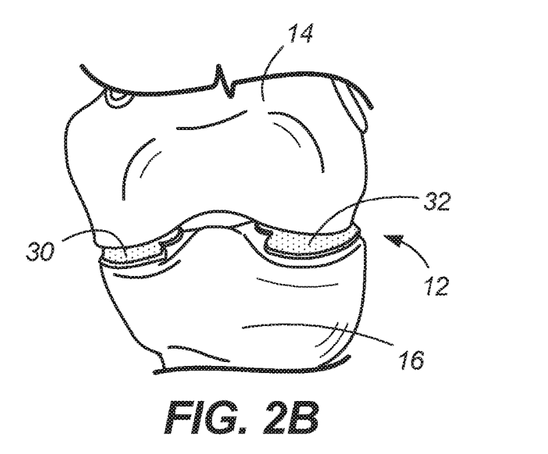
FIG. 2B is a side view of a synthetic medial meniscus and a synthetic lateral meniscus disposed between a synthetic femur and synthetic tibia of a knee model, according to one embodiment.
Figure 2C:
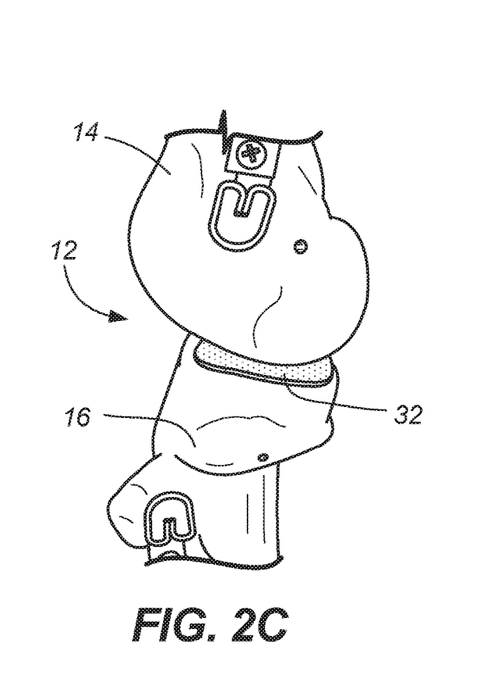
FIG. 2C is another side view of the synthetic medial meniscus and synthetic lateral meniscus disposed between the synthetic femur and synthetic tibia of the knee model of FIG. 2B.
Figure 2D:
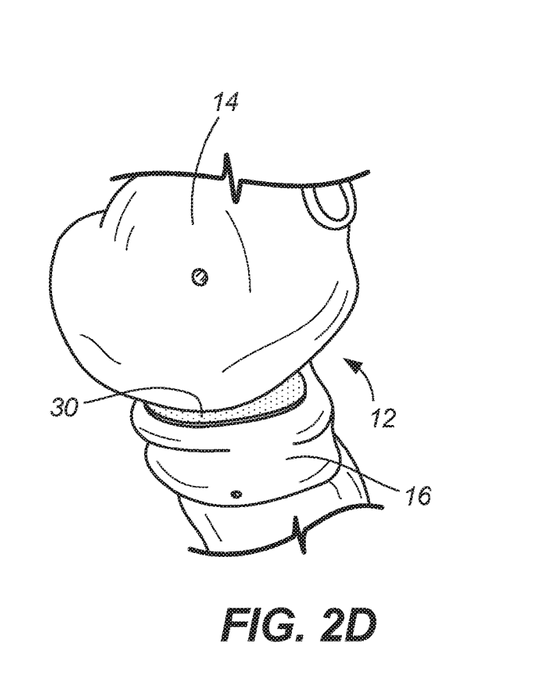
FIG. 2D is another side view of the synthetic medial meniscus and synthetic lateral meniscus disposed between the synthetic femur and synthetic tibia of the knee model of FIG. 2B.

In accordance with one embodiment, synthetic menisci are added to a known knee joint model (such as the Sawbones M.I.S. Knee™ model 10 discussed above) to simulate the movement of the knee joint 12 and interaction of the two bones (the femur 14 and the tibia 16) with the menisci, and the resulting joint with the synthetic menisci can be used as a clinical examination training tool. For example, FIGS. 2A-2D depict a tibial joint surface 22 (the proximal end of the tibia 16) with a synthetic medial meniscus 30 and a synthetic lateral meniscus 32 disposed thereon. More specifically, according to one implementation, the synthetic medial meniscus 30 and the synthetic lateral meniscus 32 are attached to the tibial joint surface 22. In one exemplary embodiment, the two synthetic menisci are attached via an adhesive or another attachment method (such as Velcro™ or some other similar attachment mechanism). The two synthetic menisci 30, 32 are constructed to replicate the size and shape of the true menisci in a human knee joint. Further, FIGS. 2B-2D depict one exemplary embodiment of the two synthetic menisci disposed between the femur 14 and the tibia 16 to simulate the human knee joint 12. For example, FIG. 2B depicts the synthetic medial meniscus 30 and the synthetic lateral meniscus 32 disposed between the femur 14 and the tibia 16, while FIG. 2C depicts the synthetic lateral meniscus 32 and FIG. 2D depicts the synthetic medial meniscus 30. In certain implementations, the two synthetic menisci 30, 32 are positioned on the tibal joint surface 22 and/or between the two bones 14, 16 to educate one or more students about the appearance, location, and general size and shape of the menisci 30, 32.

In one embodiment, the synthetic menisci are made from the padding used in prosthetic limbs. For example, in one embodiment, the padding is a prosthetic padding product having the order number GSF-3 mm or GFS-6 mm, which is purchased from ALPS in St. Petersburg, Fla. Alternatively, the synthetic menisci can be made from such materials as foam, felt padding, silicone, or any relatively pliable plastic. In a further embodiment, the synthetic menisci can be made from any material that can substantially replicate the size and physical features of natural menisci in relation to the synthetic knee joint in bone models and other similar uses.

Figure 3A:
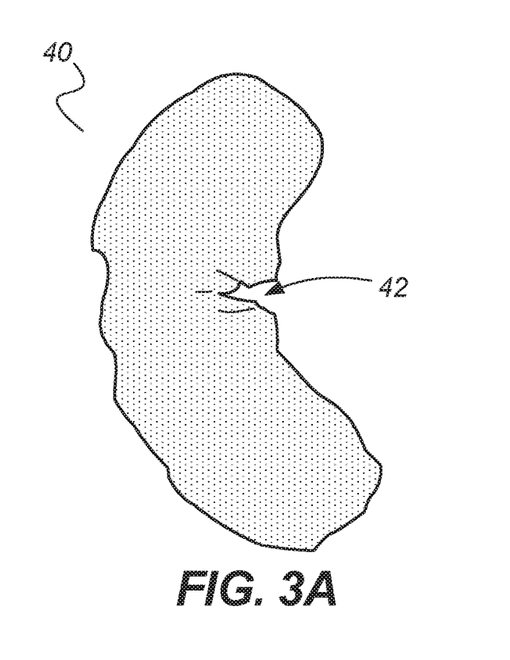
FIG. 3A is a top view of a synthetic meniscus model with a radial meniscus tear, according to one embodiment.

In other implementations, various tears or other types of damage to the menisci can be replicated with synthetic menisci that mimic such damage. For example, FIG. 3A depicts a synthetic meniscus model 40 with a radial meniscus tear 42. It is understood that radial meniscus tears run across the width of meniscus as shown in the model 40. This damaged meniscus model 40 can be used to depict the appearance of a radial meniscus tear 42 for a student. Alternatively, the model 40 with the tear 42 can also be positioned between a synthetic femur and synthetic tibia (such as the femur 14 and tibia 16 discussed above) of a knee joint model (such as model 10 above) such that the student can experience how the damaged meniscus model 40 might influence the movement of the knee joint and interaction of the two bones, as will be discussed in further detail below.

Figure 3B:
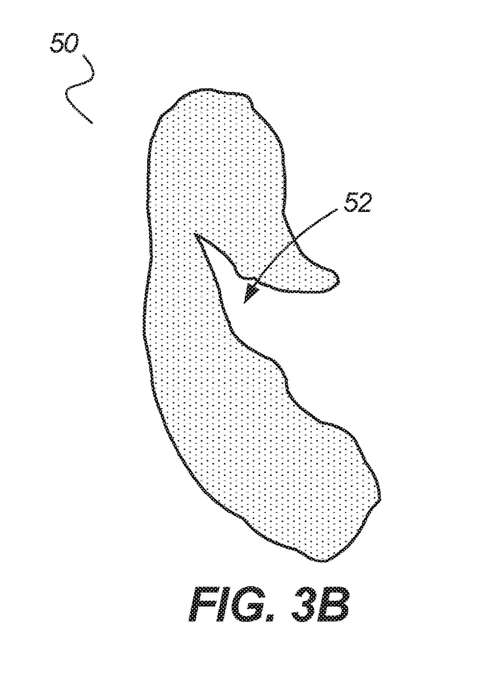
FIG. 3B is a top view of a synthetic meniscus model with a more extensive radial meniscus tear or "parrot beak" meniscus tear, according to one embodiment.

FIG. 3B depicts another synthetic meniscus model 50 with a more extensive radial tear 52 that is commonly called a "parrot beak" meniscus tear 52 in which the tear has extended across a larger portion of the meniscus 50 and begins to extend longitudinally along the length of the meniscus as well, thereby extending at an angle along the meniscus 50 in comparison to the radial tear 42 discussed. It is understood that in a human knee, an untreated radial tear (similar to the synthetic tear 42 above) can worsen into a parrot beak tear (similar to the synthetic parrot beak tear 52 above). It is further understood that this synthetic damaged meniscus model 50, like the above model 40 and the rest of the damaged meniscus models disclosed or contemplated herein, can be used in an educational environment such that a student can see what the damage looks like and further can be positioned between a synthetic femur and synthetic tibia (such as the femur 14 and tibia 16 discussed above) of a knee joint model (such as model 10 above) such that the student can experience how the damaged meniscus model 50 might influence the movement of the knee joint and interaction of the two bones, thereby educating the student about the experience of performing a clinical examination on a knee with similar damage.

Figure 4A:
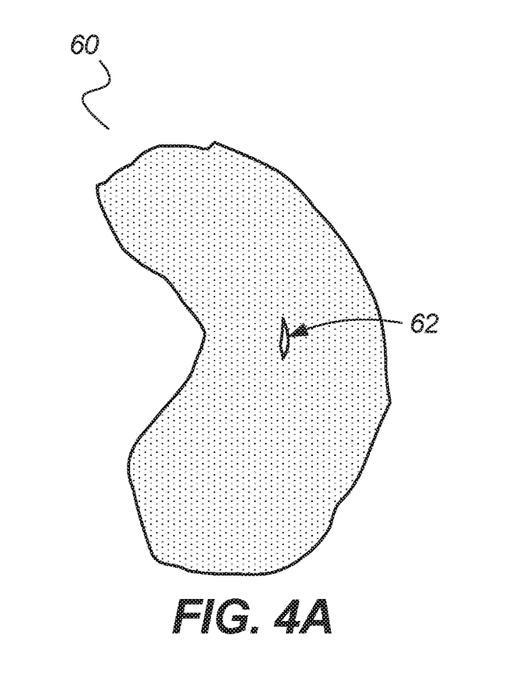
FIG. 4A is a top view of a synthetic meniscus model with a horizontal meniscus tear, according to one embodiment.

According to a further embodiment, FIG. 4A depicts a synthetic meniscus model 60 with a horizontal meniscus tear 62 (also referred to as a "transverse" or "cleavage" tear), which is a tear in the horizontal axis along the length of the meniscus 60 that splits the meniscus 60 into superior and inferior sections. It is understood that an actual horizontal tear in a natural meniscus runs parallel to the plane of the figure, thereby splitting a portion of the meniscus into an upper portion and a lower portion. As with the prior damaged meniscus models (discussed above), the model 60 can depict the appearance of the horizontal tear 62 and/or can be positioned in a knee joint model (such as model 10 above) to allow the student to experience how the model 60 might mimic a clinical examination of such an injury.

Figure 4B:
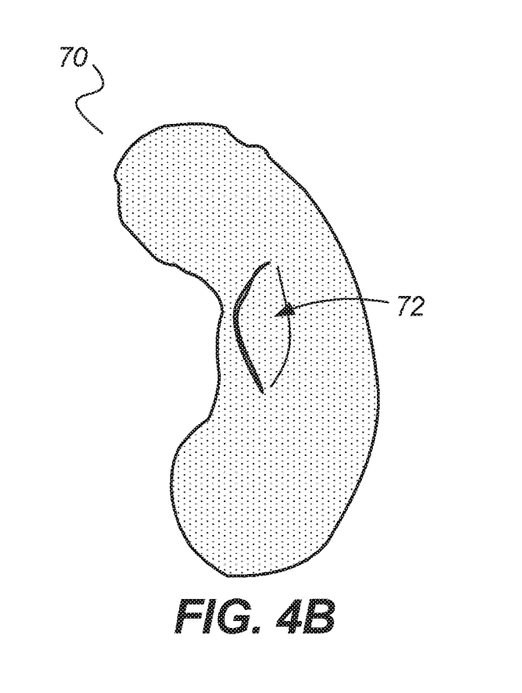
FIG. 4B is a top view of a synthetic meniscus model with a more extensive horizontal meniscus tear or "flap" meniscus tear, according to one embodiment.

FIG. 4B depicts another synthetic meniscus model 70 with a more extensive horizontal tear 72 that is commonly called a "flap" meniscus tear 72 in which the tear has extended across a larger portion of the length of the meniscus 70 in comparison to the horizontal tear 62 discussed above. It is understood that in a human knee, an untreated horizontal tear (similar to the synthetic tear 62 above) can worsen into a flap tear (similar to the synthetic flap tear 72 above). A flap meniscus tear (such as the synthetic tear 72) starts horizontally and curves in a longitudinal direction. This creates a loose flap of cartilage and causes pain. Thus, this synthetic damaged meniscus model 70 can also be used in an educational environment such that a student can see what the damage looks like and/or can be positioned in a knee joint model (such as model 10 above) to allow the student to experience how the model 70 might mimic a clinical examination of such an injury.

Figure 5:
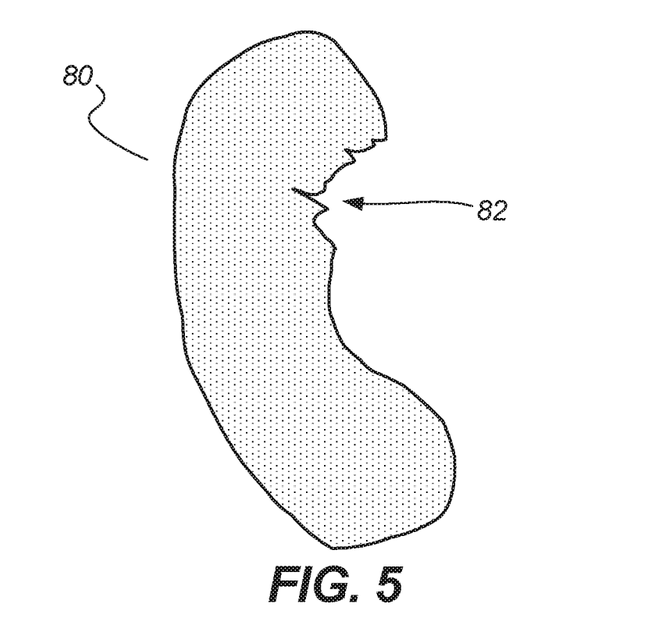
FIG. 5 is a top view of a synthetic meniscus model with degenerative meniscus tears, according to one embodiment.

In accordance with another implementation, FIG. 5 depicts a synthetic meniscus model 80 with degenerative meniscus tears 82, which are frayed and fibrillized tears 82 at the inner edge of the meniscus model 80. These tears are common in the elderly and in osteoarthritic joints and result from menisci that have been worn down from repetitive stress or osteophytes. As with the prior damaged meniscus models (discussed above), the model 80 can depict the appearance of the degenerative tear 82 and/or can be positioned in a knee joint model (such as model 10 above) to allow the student to experience how the model 80 might mimic a clinical examination of such an injury.

Figure 6A:
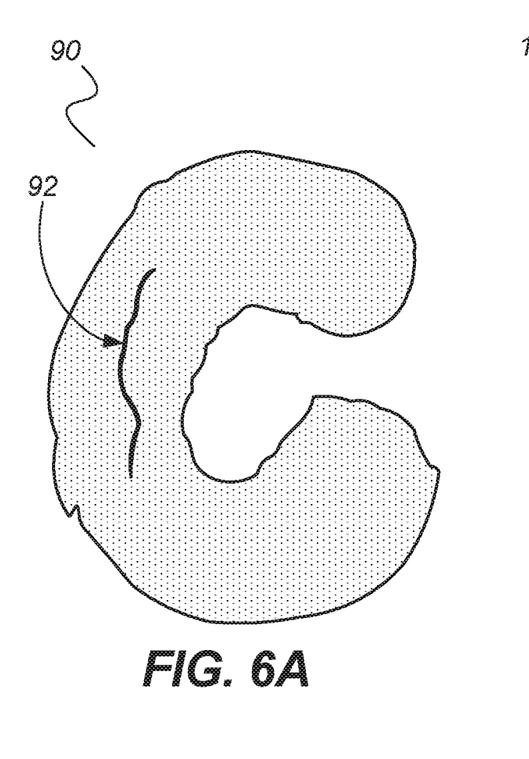
FIG. 6A is a top view of a synthetic meniscus model with a longitudinal meniscus tear, according to one embodiment.

FIG. 6A depicts another embodiment of a synthetic meniscus model 90 with a longitudinal meniscus tear 92. A longitudinal meniscus tear 92 typically runs along the length of the meniscus 90, frequently presents with an anterior cruciate ligament (ACL) tear, and is common in younger or more active patients. As with the prior damaged meniscus models (discussed above), the model 90 can depict the appearance of the longitudinal tear 92 and/or can be positioned in a knee joint model (such as model 10 above) to allow the student to experience how the model 90 might mimic a clinical examination of such an injury.

Figure 6B:
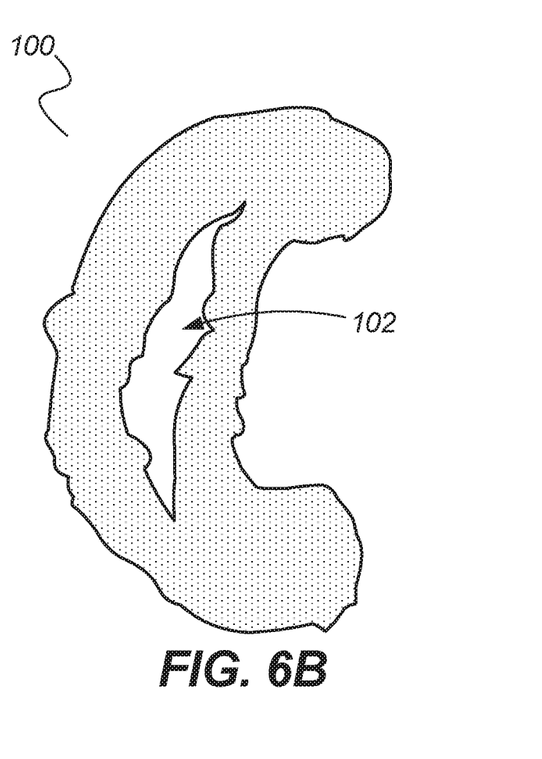
FIG. 6B is a top view of a synthetic meniscus model with a more extensive longitudinal meniscus tear or "bucket handle" meniscus tear, according to one embodiment.

FIG. 6B depicts a further synthetic meniscus model 100 with a more extensive longitudinal tear 102 that is commonly called a "bucket handle" meniscus tear 102 in which the tear has extended across a larger portion of the length of the meniscus 100 in comparison to the longitudinal tear 92 discussed above. It is understood that in a human knee, an untreated longitudinal tear (similar to the synthetic tear 92 above) can worsen into a bucket handle tear (similar to the synthetic bucket handle tear 102 above). As above, this synthetic damaged meniscus model 100 can also be used in an educational environment such that a student can see what the damage looks like and/or can be positioned in a knee joint model (such as model 10 above) to allow the student to experience how the model 100 might mimic a clinical examination of such an injury.

According to certain implementations, the various damaged meniscus models disclosed above or contemplated herein can be incorporated into a knee joint model (such as the model 10 above) that is utilized in cooperation with or in combination with a treatment platform. One embodiment of such a platform 110 is depicted in FIGS. 7A-8B. In accordance with this specific embodiment, the platform 110 is a stand, support, frame, or any other such structure 110 having a base 112 with a substantially flat top surface 114 and side walls 116. In addition, the platform 110 has an attachment wall 118 attached to the base 112 with a coupling component 120 attached to the attachment wall 118. In addition, in certain embodiments, a strap 122 is operably attached to the base 112 (either with the ends of the strap 122 being attached to the base 112 or with the strap 122 being a loop being positioned entirely around the base 112 as shown).

Figure 7A:
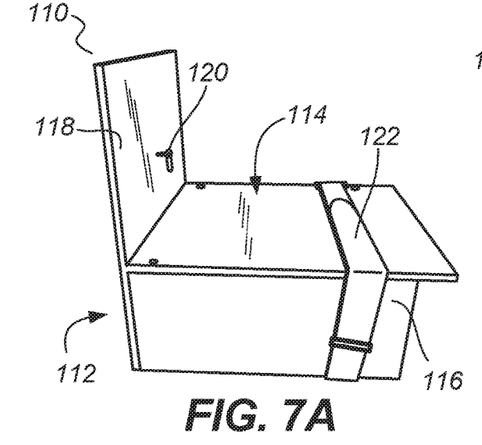
FIG. 7A is a side view of a clinical knee treatment simulation platform, according to one embodiment.
Figure 7B:
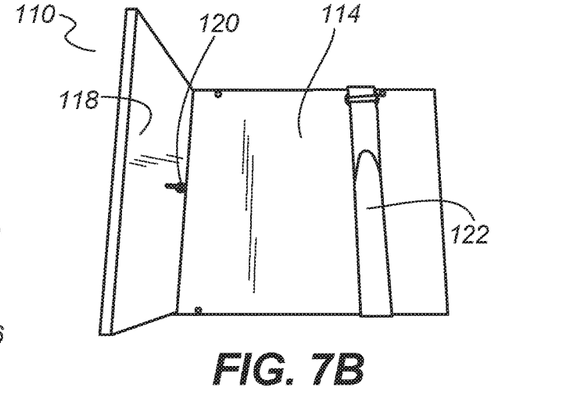
FIG. 7B is a top view of the clinical knee treatment simulation platform of FIG. 7A.

Any treatment platform embodiment (such as the specific exemplary platform 110 above) as disclosed or contemplated herein is used in combination with a knee joint model (such as the model 10 above) as an educational tool for those training to perform clinical examinations of knee joints. It is understood that any further discussion of the platform 110 applies to any platform embodiment except as to specific, optional components. When a model knee joint (such as model 10) is coupled thereto, the platform 110 acts to replicate the positioning, movement, and stability of a patient's knee during a standard clinical examination when a patient is positioned on a clinic bed, chair, or other standard examination furniture in which the patient's tibia is hanging downward from the knee joint but the patient's foot is not in contact with the floor, ground, or any other object or surface, but instead is hanging free. More specifically, the coupling of the knee joint model (such as model 10) to the platform 110 causes the knee joint model to substantially mimic a patient's knee joint in a clinical examination, stabilizing the knee and allowing the examiner to manipulate the tibia in relation to the femur. This will be discussed in further detail below.

In one embodiment, the attachment wall 118 is a wall (also referred to as a "proximal wall") 118 coupled to a proximal or rear portion of the base 112. Alternatively, the attachment wall 118 is any structure attached to the base 112 or otherwise coupled to the platform 110 that provides for a coupling component (such as the coupling component 120 discussed above) to which the model (such as the model femur) can be coupled as will be discussed in further detail below. Further, according to certain embodiments, the coupling component 120 can be any attachment device or mechanism for coupling the proximal end of a model femur (such as model femur 14) to the attachment wall 118 at some predetermined height above the base 112. For example, in one implementation, the coupling component 120 is positioned about 1 to 7 inches above the surface 114. Alternatively, the height of the coupling component 120 above the surface 114 can range from about 5 inches to about 6 inches. In a further alternative, the height can be any height that results in the knee joint substantially mimicking the knee joint of a patient when the patient is positioned on a standard examination table or other such examination equipment. Further, in one exemplary embodiment, the coupling component 120 is an eye screw 120. Alternatively, the coupling component 120 can be a hook, ring, clip, or any other known fastener that can be used to couple the model femur 14 to the attachment wall 118.

According to one implementation, the base 112 is a box-shaped structure 112 that has side walls 116 sufficient to provide some height to the structure 112. In one embodiment, the side walls 116 must have a minimum height of about 1 inch. Alternatively, the side walls 116 have a height ranging from about 1 inch to any height. According to one embodiment, the side walls 116 have a height of about 7 inches. In a further alternative, the side walls 116 have any height that allows a physician or other professional to simulate a clinical examination of a model knee joint in which the model tibia extends out and downward from the base 112 to simulate a patient's tibia extending downward and away from an examination table or other type of examination structure on which the patient is positioned.

In accordance with one embodiment, the strap 122 is a long strap 122 that can be used to restrain or otherwise retain the model knee joint in position as will be discussed in further detail below. Alternatively, the strap can be any known mechanism or device that hold the model knee joint in position as disclosed or contemplated herein.

Figure 8A:
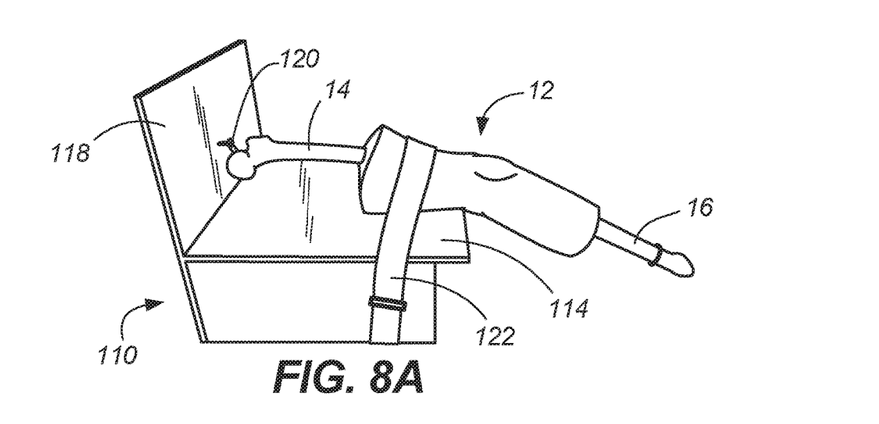
FIG. 8A is a side view of the clinical knee treatment simulation platform of FIG. 7A with a knee model disposed thereon.
Figure 8B:
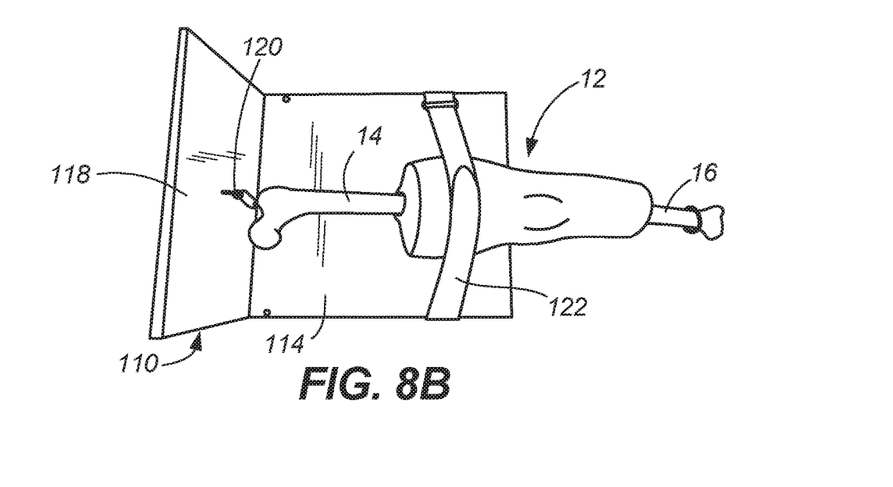
FIG. 8B is a top view of the clinical knee treatment simulation platform of FIG. 7A with the knee model disposed thereon.

In use as shown in FIGS. 8A and 8B, a knee joint model such as the Sawbones M.I.S. Knee™ 10 as discussed above can be used in combination with the examination platform 110, according to one embodiment. The proximal end of the model femur 14 is coupled to the coupling component 120 on the attachment wall 118, and the strap 122 is positioned over a distal portion of the femur 14 such that the knee joint 12 is positioned such that it extends distally beyond the distal end of the surface 114 as shown. As can be understood by an examiner, this configuration allows for the knee joint 12 to simulate the movement of a patient's knee joint and the interaction of the model tibia 16 and model femur 14 simulate the interaction of a patient's tibia and femur such that the platform 110 and knee joint model 10 provide a realistic simulation of an examination of a patient's knee. That is, the platform 110 stabilizes the knee joint 12 and allows a student examiner to manipulate the synthetic tibia 16 in relation to the synthetic femur 14. Further, the strap 122 stabilizes the synthetic femur 14 but also allows movement thereof such that the examiner can move and manipulate the femur 14 and thus the knee joint 12 in relation to the platform more than if the femur 14 were fixedly attached at the distal portion with a fixed fastener instead of the strap 122.

According to one implementation, coupling the proximal end of the synthetic femur 14 to the coupling component 120 such that the proximal end is positioned at the predetermined height of the coupling component 120 results in the knee joint 12 having around 20 to 30 degrees of flexion.

Further, in accordance with certain embodiments, the positioning of the synthetic femur 14 on the platform 110 allows an examiner to displace the synthetic tibia 16 anteriorly such that the examiner can simulate performance of the known Lachman test in a simplified fashion that facilitates practice and mastering of the test. Typically, the Lachman test is performed by an examiner on the patient via the examiner utilizing her/his own knee or hands to flex the knee joint 20 to 30 degrees as discussed above, using one of her/his hands to stabilize the femur 14, and using her/his other hand to manipulate anterior translation of the tibia 16 in relation to the femur 14. In contrast, the platform 110 makes it possible for the examiner to achieve 20-30 degrees of knee joint 12 flexion and stabilization of the femur 14 with the platform 110 (rather than the examiner's own hands or knee) while focusing solely on translating the tibia anteriorly, thereby simplifying performance of the Lachman test for purposes of learning the test and mastering the performance thereof. Once the student examiner achieves proficiency of the test using the platform 110, the platform 110 can be removed and the examiner can proceed to performing the test on a patient using her/his thigh or hands as a bolster to achieve 20-30 degrees of knee flexion. The platform 110 allows for step-by-step learning and successful performance of the Lachman test by a student during the learning process.

In another implementation, the platform 110 can also be useful to practice flexing and extending the knee joint 12 when examining the joint 12 for meniscus tears. For example, a student examiner can learn proper technique relating to flexing and extending and otherwise manipulating the knee joint 12 without fear of harm to the patient.

In addition, according to a further implementation, a student examiner can utilize the synthetic knee joint 12 to gain experience with various types of meniscus damage, such as, for example, any of the meniscus injuries discussed above with respect to FIGS. 3A-6B.

For example, in one embodiment, the student examiner can learn the symptoms that may exhibit in a clinical examination of a particular meniscus tear: in this case, a meniscus tear that has flipped in the joint line, resulting in an extension block. For example, in some instances, a bucket handle tear similar to that discussed above in relation to FIG. 6B can displace and become entrapped between the femoral and tibial joint surfaces, which can cause mechanical locking such that the patient is unable to fully extend the knee. As a result, this type of tear can result in the patient being unable to actively extend the knee and thus further result in the examiner being unable to passively extend the knee.

Figure 9A:
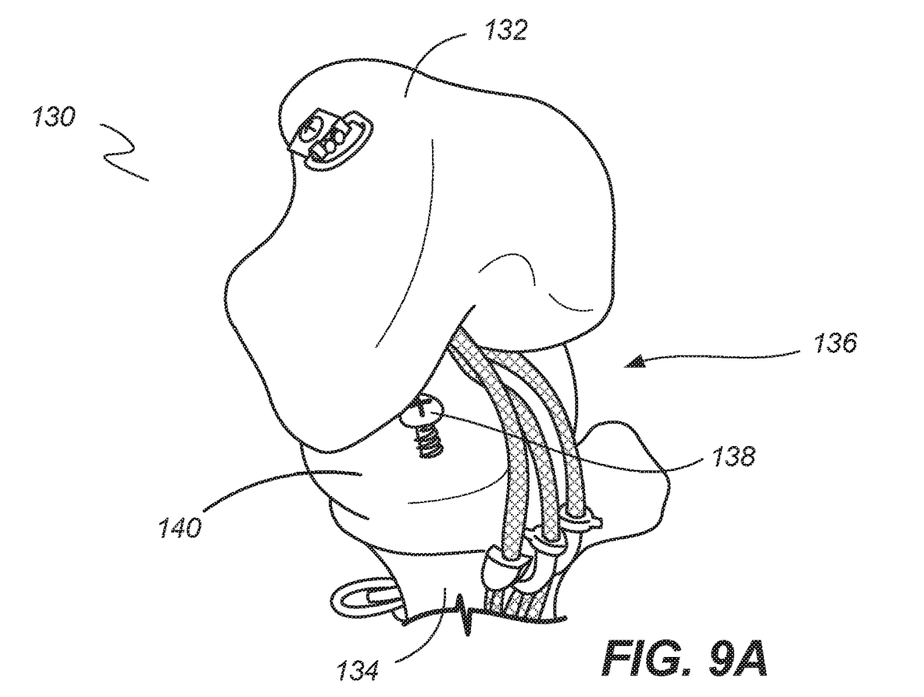
FIG. 9A is a perspective view of a synthetic femur and synthetic tibia of a knee model that simulates mechanical locking of the knee joint, according to one embodiment.
Figure 9B:
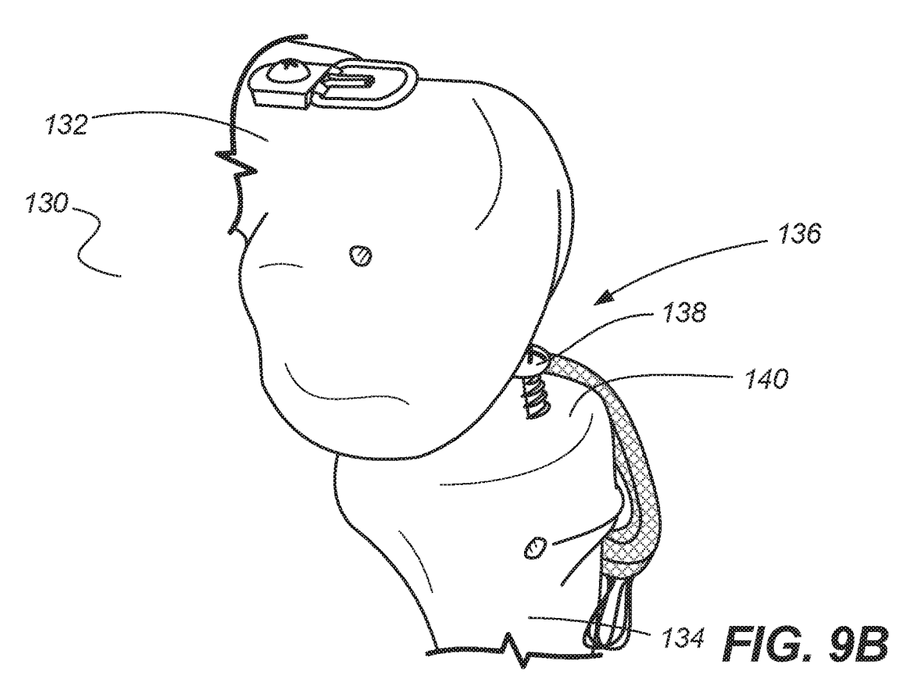
FIG. 9B is a side view of the knee model of FIG. 9A.

In one implementation, a knee joint model can be created that simulates a mechanical locking of the joint such as described above. One exemplary implementation is depicted in FIGS. 9A and 9B, in which a knee joint model 130 is provided with a synthetic femur 132, a synthetic tibia 134, a knee joint 136 having a blocking mechanism 138 which in this case is a threaded screw 138 affixed to the tibial joint surface 140 such that the screw 138 extends out of the tibial joint surface 140 as shown. It is understood that the blocking mechanism 138 can be any type of fixture, mechanism, or device that can be positioned or affixed on or in the knee joint 136 in a similar fashion so as to block normal movement of the two bones 132, 134 in relation to each other to simulate the mechanical locking of the knee joint 136.

Although the present invention has been described with reference to preferred embodiments, persons skilled in the art will recognize that changes may be made in form and detail without departing from the spirit and scope of the invention.

What is claimed is:

1. An educational knee joint model, comprising:
   (a) a synthetic tibia comprising a tibial joint surface;
   (b) a synthetic medial meniscus attached to the tibial joint surface;
   (c) a synthetic lateral meniscus attached to the tibial joint surface; and
   (d) a synthetic femur comprising a femoral joint surface, wherein the synthetic femur is positioned such that the femoral joint surface is positioned in contact with the synthetic medial meniscus and the synthetic lateral meniscus.

2. The educational knee joint model of claim 1, wherein one of the synthetic medial meniscus or the synthetic lateral meniscus has a radial meniscus tear formed therein.

3. The educational knee joint model of claim 1, wherein one of the synthetic medial meniscus or the synthetic lateral meniscus has a parrot beak meniscus tear formed therein.

4. The educational knee joint model of claim 1, wherein one of the synthetic medial meniscus or the synthetic lateral meniscus has a horizontal meniscus tear formed therein.

5. The educational knee joint model of claim 1, wherein one of the synthetic medial meniscus or the synthetic lateral meniscus has a flap meniscus tear formed therein.

6. The educational knee joint model of claim 1, wherein one of the synthetic medial meniscus or the synthetic lateral meniscus has a degenerative meniscus tear formed therein.

7. The educational knee joint model of claim 1, wherein one of the synthetic medial meniscus or the synthetic lateral meniscus has a longitudinal meniscus tear formed therein.

8. The educational knee joint model of claim 1, wherein one of the synthetic medial meniscus or the synthetic lateral meniscus has a bucket handle meniscus tear formed therein.

9. An educational knee joint treatment platform comprising:
   (a) a base comprising a top surface disposed on a top portion of the base;
   (b) an attachment wall coupled to a proximal portion of the base;
   (c) a coupling component attached to the attachment wall; and
   (d) a retention strap removably attached to the base and disposed across the top surface.

10. The educational knee joint treatment platform of claim 9, wherein the base further comprises side walls, wherein the top surface is disposed on top of the side walls.

11. The educational knee joint treatment platform of claim 9, wherein the top surface and the retention strap are constructed and arranged to receive an educational knee joint model therebetween such that knee joint model simulates movement of an actual knee of a patient during a clinical examination such that a student can practice performing the clinical examination of the knee joint model.

* * * * *